Figure 1:
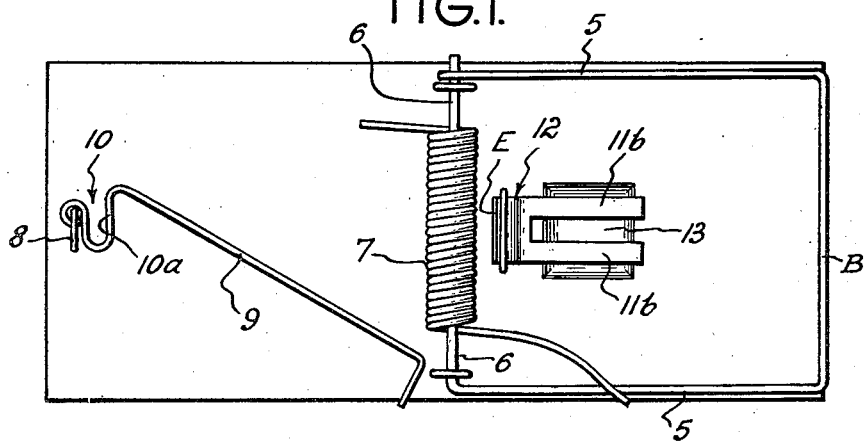

Feb. 3, 1942.    A. M. CAMERON    2,271,996
ANIMAL TRAP
Filed May 18, 1940

INVENTOR
ANGUS MACGREGOR CAMERON
By
Young, Emery & Thompson
ATTYS.

Patented Feb. 3, 1942

2,271,996

UNITED STATES PATENT OFFICE 2,271,996

ANIMAL TRAP

Angus Macgregor Cameron, Croydon, near Sydney, New South Wales, Australia

Application May 18, 1940, Serial No. 336,020
In Australia May 30, 1939

1 Claim. (Cl. 43—81)

The present invention is directed to animal traps, used extensively for example in households for trapping rats and mice and of the type having a wire loop pivoted upon a rod transversely and fixedly disposed on a flat base plate. The rod has a coiled spring wrapped along its length one end of the spring bearing upon the base plate and the other end in engagement with one arm of the wire loop so that when the latter is swung from the "sprung" to the "set" position the spring applies fast return motion to the loop which motion is restrained by a pivoted retaining bar passing over the bridging member of the loop and held in position by engagement with a pivoted trigger piece at the bait position.

Traps constructed as stated require careful handling when the setting operation is being performed as the free end of the retaining bar requires to be finely engaged in an aperture in the trigger piece which latter is contacted by an animal to cause release of the retaining bar to allow the wire loop to fly back to its sprung position.

One object of the present invention is to provide a retaining bar construction which will eliminate the requirement for entering the free end of the bar in the trigger while permitting a high degree of sensitivity to release when the trigger is contacted by an animal. According to one feature of this invention the pivoted retaining bar to engage and retain the wire loop in "set" position is provided in its length with a shoulder having its riser inclined in a direction opposed to and intersecting the return path of the wire loop, the free end of the retaining bar being downturned for support upon the upper edge of the upstanding limb of a pivoted L-shaped trigger so that when said limb is disturbed said free end drops and causes said riser face to clear the wire loop and allow the latter to effect return movement to its sprung position.

According to another feature of the invention a bait cavity of substantial area is formed in the base plate of the trap beneath the free limb of the trigger to entice an animal to disturb the latter when attempting to obtain the bait.

The accompanying drawing depicts a practical embodiment of the improvements in animal traps according to this invention.

Figure 2:
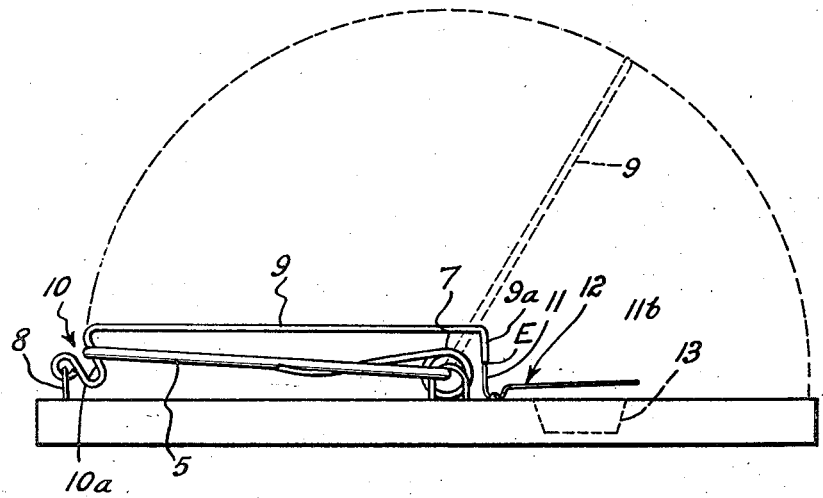

In the drawing:

Figure 1 is a plan and Figure 2 a side elevation of the trap in the sprung and set positions respectively.

As before stated the wire loop 5, fixed transverse rod 6, and spring 7 are of well known construction and form no part of the present invention.

The retaining bar 9 pivoted at one end 8 is shown pivoted outside the bridging member B of the wire loop 5 and in its length and to engage said member a shoulder 10 is provided in the bar 9.

The shoulder 10 in the illustrated arrangement is shown U-shaped the inner side 10a constituting the riser of the shoulder being inclined to take over and engage the bridging member B (see Figure 2) and intersect the path (shown in dotted lines in Figure 2) of travel of the wire loop in a direction opposed to said travel. The free end of the retaining bar 9 is raised to maintain the engagement with the bridging member B of said riser 10a by the provision of a downturned free end 9a which bears upon the upper edge E of the upstanding limb 11 of the trigger 12.

It will be understood that the shoulder 10 may be formed as a single step in the length of the retaining bar 9 the riser 10a of the step being inclined as above described.

With the upstanding limb 11 of the trigger 12 in its set tilted position in Figure 2 supporting the downturned end 9a of the retaining bar 9 in its raised position in engagement with the wire loop 5, slight radial movement of said limb in either direction will remove the support E for said bar 9 which latter will fall and clear the riser 10a of the shoulder 10 from engagement with the wire loop 5 which latter will then fly back to its sprung position in Figure 1.

The outstanding limb 11b of the trigger 12 overlying the bait cavity 13 is shown slotted in Figure 1 but may be perforated, apertured, or have an uninterrupted surface to entice an animal to impart releasing movement to the trigger in an endeavour to obtain the bait.

The action of the spring 7 upon the wire loop 5 when the trap is in its set position will impart downward pressure on the upstanding limb 11 of the trigger 12 and maintain the latter in position for release of the trap when radial movement is imparted to the said limb 11 about the pivot of the trigger at the junction of the two limbs of the latter. It will be understood that the edge E of said limb 11 of the trigger 12 will have a slight cross sectional dimension to constitute a knife edge in effect and consequently the trap will be highly sensitive to release.

The trigger may be arranged to be operated by a rod disposed above the bridge member as in present forms of traps, in which case if upward movement of the trigger is limited positively, the bait when placed in a cavity in the base of the trap will not be readily removable without setting off the trap.

I claim:

A trap of the type herein specified and comprising a base, a pair of transversely aligned pivot members carried by said base intermediate of its ends, an animal engaging loop member having one end pivotally mounted in said pivot members, a spring coiled about the pivoted end of said loop member and tensioned to urge the latter radially into sprung position, a trigger member pivoted on said base ahead of the pivotal mounting of said loop, said trigger member being of L-formation with a vertically disposed limb and a horizontally disposed limb, a bait cavity formed in said base below said last-mentioned limb, said horizontal limb being apertured to expose the bait in said cavity and directed forwardly along the longitudinal axis of said base, a loop retaining bar pivoted to the rear end of said base at a point outside the arc of movement of the free end of said animal engaging loop and formed near its pivot with a U-shaped return bend, the inner limb of said U-bend being adapted to intersect the path of movement and retain the outer end of said loop in set position, the free end of said loop retaining bar being downturned for support upon the upper edge of the vertically disposed limb of said trigger member, whereby rotary movement of said trigger member in either direction about its pivotal axis removes support from the downturned free end of said loop retaining bar to release said animal engaging loop from set position.

A. M. CAMERON.